United States Patent
Xue et al.

(10) Patent No.: US 11,006,346 B2
(45) Date of Patent: May 11, 2021

(54) X2 SERVICE TRANSMISSION METHOD AND NETWORK DEVICE

(71) Applicant: HUAWEI TECHNOLOGIES CO., LTD., Guangdong (CN)

(72) Inventors: Wan Xue, Hangzhou (CN); Changcong Dong, Shanghai (CN); Jianfeng Chen, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/424,011

(22) Filed: May 28, 2019

(65) Prior Publication Data

US 2019/0281530 A1 Sep. 12, 2019

Related U.S. Application Data

(63) Continuation of application No. PCT/CN2016/107711, filed on Nov. 29, 2016.

(51) Int. Cl.
| | |
|---|---|
| *H04W 40/34* | (2009.01) |
| *H04W 76/12* | (2018.01) |
| *H04L 29/06* | (2006.01) |
| *H04W 24/00* | (2009.01) |
| *H04W 12/102* | (2021.01) |

(52) U.S. Cl.
CPC .......... *H04W 40/34* (2013.01); *H04L 63/164* (2013.01); *H04L 63/205* (2013.01); *H04W 12/102* (2021.01); *H04W 24/00* (2013.01); *H04W 76/12* (2018.02)

(58) Field of Classification Search
CPC ..... H04W 40/34; H04W 24/00; H04W 76/12; H04W 12/1002; H04L 63/164; H04L 63/205
See application file for complete search history.

(56) References Cited

U.S. PATENT DOCUMENTS

| | | | |
|---|---|---|---|
| 2011/0225424 A1* | 9/2011 | Zee | H04W 12/04 713/171 |
| 2014/0177434 A1* | 6/2014 | Cartmell | H04L 41/0654 370/221 |
| 2015/0282222 A1 | 10/2015 | Yan et al. | |
| 2017/0006648 A1* | 1/2017 | Aronius | H04W 72/0426 |
| 2017/0250899 A1* | 8/2017 | Chan | H04L 69/22 |

FOREIGN PATENT DOCUMENTS

| | | | | |
|---|---|---|---|---|
| CN | 101772052 A | 7/2010 | | |
| CN | 103220818 A | 7/2013 | | |
| WO | 2010/052169 A1 | 5/2010 | | |
| WO | WO-2016082412 A1 * | 6/2016 | ............ | H04W 24/02 |
| WO | 2016141964 A1 | 9/2016 | | |

* cited by examiner

*Primary Examiner* — Peter P Chau
(74) *Attorney, Agent, or Firm* — Womble Bond Dickinson (US) LLP (57) ABSTRACT

An X2 service transmission method and a network device are disclosed. The method includes if a first IPsec tunnel is unavailable, detecting, by a first base station, whether a second IPsec tunnel between the first base station and a security gateway is available, where the first IPsec tunnel is an IPsec tunnel established between the first base station and a second base station, and the first base station can transmit X2 service data with the second base station through the second IPsec tunnel; and transmitting the X2 service data through the second IPsec tunnel if the second IPsec tunnel is available.

10 Claims, 4 Drawing Sheets

X2 SERVICE TRANSMISSION METHOD AND NETWORK DEVICE

CROSS-REFERENCE TO RELATED APPLICATIONS

This application is a continuation of International Application No. PCT/CN2016/107711, filed on Nov. 29, 2016, the disclosure of which is hereby incorporated by reference in its entirety.

TECHNICAL FIELD

This application relates to the field of communications technologies, and in particular, to an X2 service transmission method and a network device.

BACKGROUND

With rapid development of mobile communications technologies, a third generation mobile communications system is already in a Long Term Evolution (LTE) phase. In addition, due to features such as a large amount of telecommunication service data, a complex network structure, and all-Internet Protocol (Internet Protocol)-based LTE, the 3GPP recommends using an Internet Protocol Security (IPsec) technology to enhance protection of data services. IPsec is an open IP layer security framework protocol formulated by the Internet Engineering Task Force (IETF), and is a layer 3 tunneling protocol. IPsec works at a network layer, and can provide security protection for transmission of sensitive data, and protect and authenticate an IP data packet transmitted between devices participating in IPsec. IPsec prevents data from being monitored, tampered, and forged by an attacker during transmission over a public network.

In the prior art, for an LTE wireless backhaul network, a plaintext mechanism is used to transmit communication data of a base station. To be specific, an X2 interface data stream between base stations is very likely to be deciphered, eavesdropped, impersonated, tampered, and the like, and is faced with a great security risk. To reduce the security risk, transmission security of the X2 interface data stream has been protected in the prior art by supporting an X2 interface security tunnel automatically established between the base stations. However, when an X2 service needs to be transmitted between base stations, an automatically established direct IPsec tunnel is unavailable. Therefore, a data packet corresponding to the X2 service can only be discarded, and consequently transmission of the X2 service cannot be completed. Alternatively, even if there may be another preset standby direct IPsec tunnel used with the direct IPsec tunnel for redundancy purposes, it is likely that no effective redundancy can be achieved even if there are many standby direct IPsec tunnels because a physical link between the base stations is unavailable or fails. As a result, communication efficiency is low, affecting user experience.

SUMMARY

A technical problem to be resolved in embodiments of this application is to provide an X2 service transmission method and a network device, to resolve a technical problem that automatic redundancy cannot be achieved when an X2 service is transmitted between base stations through a direct IPsec tunnel.

According to a first aspect, an embodiment of this application provides an X2 service transmission method. The method may include:

if a first IPsec tunnel is unavailable, detecting, by a first base station, whether a second IPsec tunnel between the first base station and a security gateway is available, where the first IPsec tunnel is an IPsec tunnel established between the first base station and a second base station, and the first base station can transmit X2 service data with the second base station through the second IPsec tunnel; and transmitting the X2 service data through the second IPsec tunnel if the second IPsec tunnel is available. If an IPsec tunnel automatically established between base stations is unavailable, it is further determined whether an IPsec tunnel between a base station and a security gateway is available. If the IPsec tunnel between the base station and the security gateway is available, X2 service data is transmitted through the IPsec tunnel between the base station and the security gateway. This resolves a problem that security redundancy cannot be automatically achieved when X2 service data is transmitted between base stations through an IPsec tunnel, thereby improving reliability of X2 service data transmission.

With reference to the first aspect, in a first implementation, the first base station can transmit X2 service data with any other base station through the second IPsec tunnel. The second IPsec tunnel is configured to be in a form of supporting X2 service transmission between the first base station and any other base station, so that the second IPsec tunnel can support redundancy of IPsec tunnels between more base stations, thereby improving reliability of X2 service data transmission in an entire system.

With reference to the first aspect or the first implementation of the first aspect, in a second implementation, after the transmitting the X2 service data through the second IPsec tunnel, the method further includes: determining whether the first IPsec tunnel is available; and switching the X2 service data transmitted through the second IPsec tunnel to the first IPsec tunnel for transmission if the first IPsec tunnel is available. Whether transmission efficiency can be further improved is further monitored while ensuring that an X2 service can be transmitted, and if a direct IPsec tunnel (the first IPsec tunnel) is available, the X2 service is still switched to the direct IPsec tunnel for transmission, to reduce a service delay and improve transmission efficiency.

With reference to the second implementation of the first aspect, in a third implementation, the determining whether the first IPsec tunnel is available includes: initiating an IPsec tunnel establishment request packet to the second base station; and if receiving an IPsec tunnel establishment response packet fed back by the second base station, determining that the first IPsec tunnel is available.

With reference to any one of the first aspect or the foregoing implementations of the first aspect, in a fourth implementation, the method further includes: discarding, by the first base station, the X2 service data if neither the first IPsec tunnel nor the second IPsec tunnel is available. If neither the first IPsec tunnel nor the second IPsec tunnel is available, a data packet corresponding to the X2 service is discarded, to avoid a data security risk.

With reference to any one of the first aspect or the foregoing implementations of the first aspect, in a fifth implementation, the method further includes: transmitting, by the first base station, the X2 service data through the first IPsec tunnel if the first IPsec tunnel is available. If the first IPsec tunnel is available, the X2 service is preferentially considered to be transmitted through the first IPsec tunnel, to reduce a service delay and improve transmission efficiency.

According to a second aspect, an embodiment of this application provides a network device. The network device is a first base station, and may include a processor and a transceiver, where the processor is configured to: if a first IPsec tunnel is unavailable, detect whether a second IPsec tunnel between the first base station and a security gateway is available, where the first IPsec tunnel is an IPsec tunnel established between the first base station and a second base station, and the first base station can transmit X2 service data with the second base station through the second IPsec tunnel; and the transceiver is configured to send and/or receive the X2 service data through the second IPsec tunnel if the second IPsec tunnel is available.

With reference to the second aspect, in a first implementation, the first base station can transmit X2 service data with any other base station through the second IPsec tunnel.

With reference to the second aspect or the first implementation of the second aspect, in a second implementation, the processor is further configured to: after the X2 service data is transmitted through the second IPsec tunnel, determine whether the first IPsec tunnel is available; and the transceiver is further configured to switch the X2 service data transmitted through the second IPsec tunnel to the first IPsec tunnel for transmission if the first IPsec tunnel is available.

With reference to the second implementation of the second aspect, in a third implementation, that the processor is configured to determine whether the first IPsec tunnel is available is specifically: initiating an IPsec tunnel establishment request packet to the second base station by using the transceiver; and if receiving, by using the transceiver, an IPsec tunnel establishment response packet fed back by the second base station, determining that the first IPsec tunnel is available.

With reference to any one of the second aspect or the foregoing implementations of the second aspect, in a fourth possible implementation, the processor is further configured to discard the X2 service data if neither the first IPsec tunnel nor the second IPsec tunnel is available.

With reference to any one of the second aspect or the foregoing implementations of the second aspect, in a fifth possible implementation, the transceiver is further configured to: if the first IPsec tunnel is available, determine to transmit the X2 service data through the first IPsec tunnel.

With reference to any one of the second aspect or the foregoing implementations of the second aspect, the network device further includes a memory, configured to store a program instruction and data that are necessary for the network device.

With reference to any one of the second aspect or the foregoing implementations of the second aspect, the processor is further configured to support the network device in performing a corresponding function in the method according to any one of the first aspect or the possible implementations of the first aspect, for example, controlling the transceiver to transmit service data on the first IPsec tunnel or the second IPsec tunnel.

According to a third aspect, an embodiment of this application provides a computer storage medium, configured to store a computer software instruction used by the foregoing network device provided in the second aspect. The computer software instruction includes a program designed for performing the foregoing aspect.

According to a fourth aspect, this application provides a network device. The network device has a function of implementing behavior of the network device in the foregoing method embodiment. The function may be implemented by hardware, or by hardware by executing corresponding software. The hardware or software includes one or more modules corresponding to the foregoing function. Optionally, the network device may be a radio access network device, for example, a base station.

According to a fifth aspect, this application provides a chip system. The chip system includes a processor, configured to support a network device in implementing a function in the foregoing aspect, for example, generating or processing data and/or information in the foregoing method. In a possible design, the chip system further includes a memory. The memory is configured to store a program instruction and data that are necessary for the network device. The chip system may include a chip, or may include a chip and another discrete device.

According to the X2 service data transmission method and the device that are provided in the embodiments of this application, if an IPsec tunnel automatically established between base stations is unavailable, it is further determined whether an IPsec tunnel between a base station and a security gateway is available for transmission. If the IPsec tunnel between the base station and the security gateway is available, X2 service data is transmitted through the IPsec tunnel between the base station and the security gateway. This resolves a problem that security redundancy cannot be automatically achieved when X2 service data is transmitted between base stations through an IPsec tunnel, thereby improving reliability of X2 service data transmission.

BRIEF DESCRIPTION OF DRAWINGS

The following briefly describes the accompanying drawings required for describing the embodiments.

DESCRIPTION OF EMBODIMENTS

The following describes the embodiments of this application with reference to the accompanying drawings in the embodiments of this application.

In the specification, claims, and accompanying drawings of this application, the terms "first", "second", "third", "fourth", and the like are intended to distinguish between different objects but are not intended to describe a particular order. In addition, the terms "include", "have", and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

"Embodiment" mentioned in this specification means that a particular characteristic, structure, or feature described with reference to the embodiment may be included in at least one embodiment of this application. The term appearing in various locations in this specification unnecessarily means a same embodiment, and is not an independent or alternate embodiment exclusive from another embodiment. It is explicitly and implicitly understood that the embodiments described in this specification may be combined with another embodiment.

In this application, the following describes certain terms.

(1) A network device may be various types of stations or base stations, and may be an evolved NodeB (Evolved NodeB, eNB or eNodeB) in LTE, a network device in a future 5G network, or the like. The network device in this application includes a first base station and a second base station, but is not so limited.

(2) An access control list rule (Access Control List RULE, ACLRULE) is used to specify data packets that are input/output through a port, and is applicable to all routing protocols such as an IPsec protocol and a firewall. The ACLRULE can be used in the IPsec protocol to define a data stream that needs to be protected. Based on the ACLRULE, IPsec determines packets that need security protection and packets that do not need security protection. At a tunnel initiate end, a data stream matching the ACLRULE is to be protected, to be specific, the data stream is sent after IPsec encryption processing; and a data stream that cannot match the ACLRULE is directly forwarded. At a tunnel receive end, a data stream is decrypted, it is checked whether the decrypted data stream matches the ACLRULE, and a packet that does not match the ACLRULE is discarded.

(3) Internet Key Exchange (Internet Key Exchange, IKE): IKE is a hybrid protocol, is one of a series of key exchanges, and is referred to as a "mode". IKE can be used to negotiate about a virtual private network (Virtual Private Network, VPN), and can also be used by a remote user (an IP address of the remote user does not need to be known in advance) to access a security host or network, and IKE supports client negotiation. A client mode is that a negotiator is not an endpoint that initiates a security connection. When the client mode is used, an identity of the endpoint is hidden.

(4) A security policy (IPsec Policy) is used to specify packets that need to be encrypted, corresponding algorithms such as IPsec encryption and authentication, and other IPsec-related parameters, to determine whether a transmit end and a receive end can communicate with each other, and to determine a data processing algorithm to be used for communication if the transmit end and the receive end are allowed to communicate with each other.

(5) "A plurality of" means "two or more". "And/or" describes an association relationship between associated objects and represents that three relationships may exist. For example, A and/or B may represent the following three cases: Only A exists, both A and B exist, and only B exists. The character "/" usually indicates an "or" relationship between the associated objects.

"Data" described in this application may be service data, or may include content such as signaling or a message that needs to be transmitted by a system. "Transmission" described in this application includes sending and/or receiving.

The following describes the embodiments of this application with reference to accompanying drawings.

Figure 1:
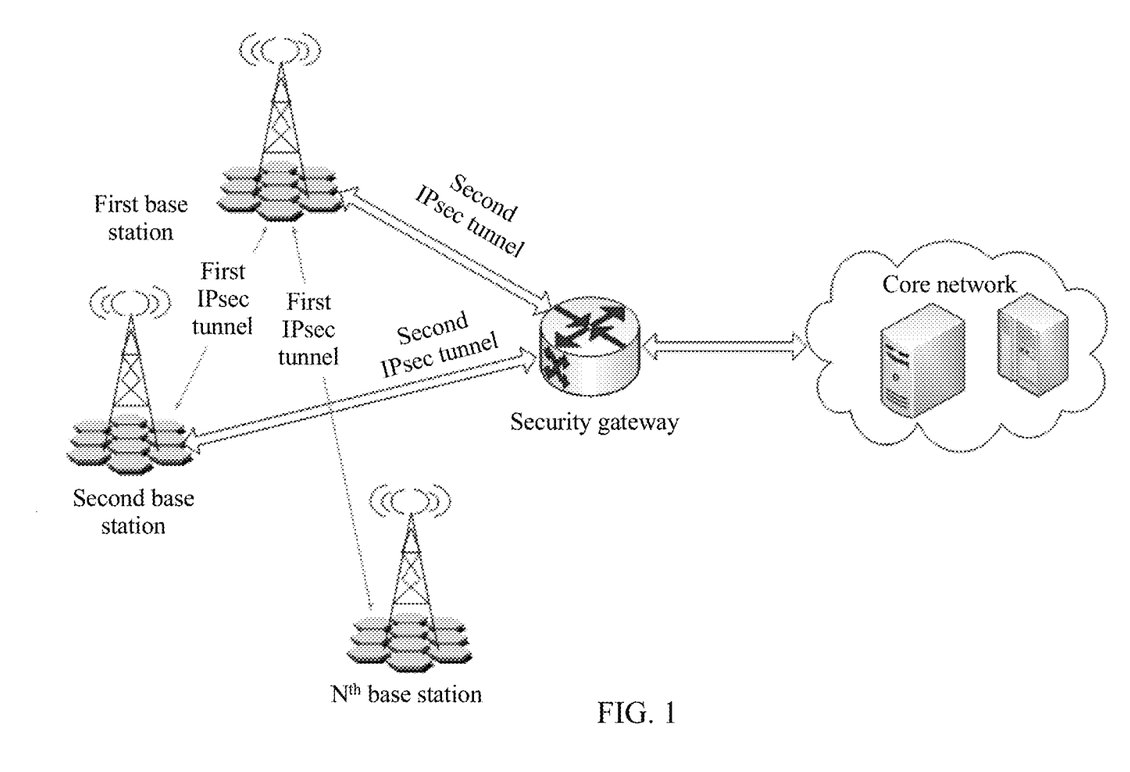
FIG. 1 is a diagram of a communications network architecture according to an embodiment.

To facilitate understanding of the embodiments, the following first describes a communications network architecture on which the embodiments of this application are based. FIG. 1 is a diagram of a communication network architecture according to an embodiment. The network architecture includes a core network, a first base station, a second base station, and a security gateway that supports an IPsec protocol. An X2 interface between the first base station and the second base station supports direct transmission of control plane information between the base stations and user plane information (data and signaling) between the base stations, to avoid a transmission delay and low communication efficiency that are caused if the information passes through the security gateway. For example, a coordinated service that is based on an IP radio access network (IPRAN) has a very high requirement on a transmission delay. Therefore, a direct dialogue through the X2 interface can effectively reduce transmission paths, thereby reducing the delay. An S1 interface is a communications interface between a base station (for example, an LTE eNodeB) and the core network (for example, a packet core network EPC), and is configured to: transfer session management (SM) and mobility management (MM) information, and transfer a user data service, to be specific, configured to transmit signaling plane and control plane information or user plane data between the base station and the core network. An IPsec tunnel established between the first base station and the second base station is a direct IPsec tunnel, may be referred to as a direct IPsec (Direct IPsec) tunnel, and is configured to transmit only an X2 service, for example, is the first IPsec tunnel in this application. The X2 service may be directly performed between the first base station and the second base station through the direct IPsec tunnel. An IPsec tunnel between the first base station and the security gateway is a security gateway IPsec tunnel, and may be configured to transmit the X2 service or an S1 service, for example, is the second IPsec tunnel in this application. Through the security gateway IPsec tunnel, the X2 service may be indirectly performed between the first base station and the second base station by using the security gateway if the direct IPsec tunnel is unavailable. In other words, the X2 service between the base stations can be transmitted through both the direct IPsec tunnel and the security gateway IPsec tunnel of the security gateway. In addition, the direct IPsec tunnel is automatically generated between the base stations, while the security gateway IPsec tunnel needs to be manually configured. Optionally, the direct IPsec tunnel in the system architecture corresponding to FIG. 1 may further include a network device such as a router or a switch. It should be noted that the network architecture in FIG. 1 is only an example implementation in the embodiments.

Figure 2:
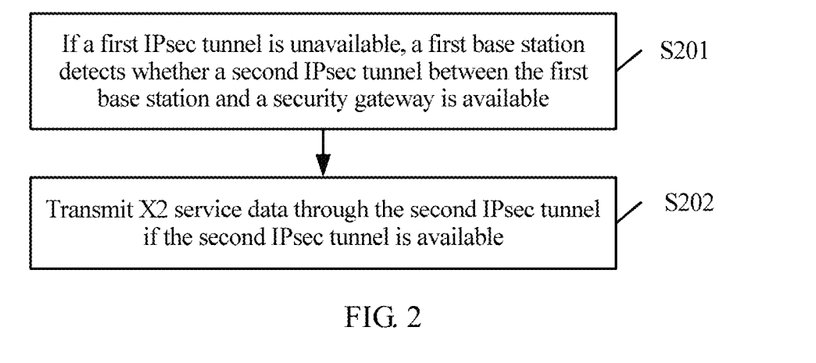
FIG. 2 is a schematic flowchart of an X2 service transmission method according to an embodiment.

FIG. 2 is a schematic flowchart of an X2 service transmission method according to an embodiment. The method may be applied to the network architecture in FIG. 1. A first base station and a second base station may be adjacent base stations, or may base stations that are not adjacent. As shown in FIG. 2, the method includes the following step S201 and step S202.

Step S201: If a first IPsec tunnel is unavailable, the first base station detects whether a second IPsec tunnel between the first base station and a security gateway is available.

Specifically, the first IPsec tunnel is an IPsec tunnel established between the first base station and the second base station, and the first base station can transmit X2 service data with the second base station through the second IPsec tunnel.

In an example, before the first base station determines that the IPsec tunnel is unavailable, the method further includes: receiving, by the first base station, Internet Protocol security IPsec tunnel establishment information, where the IPsec tunnel establishment information includes a security address of the second base station; and establishing, by the first base station, the first IPsec tunnel with the second base station based on the security address. Specifically, after receiving the security address that is of the second base station with which the first base station needs to perform security communication and that is carried in signaling sent by a core network, the first base station establishes the direct IPsec tunnel for an X2 interface with the second base station based on the security address, to perform direct security communication, and ensure a low delay and communication security. For example, in a 3GPP protocol, a signaling message of "MME CONFIGURATION TRANSFER" includes a security peer address, and a base station (the first base station, for example, an eNodeB) automatically establishes an IPsec tunnel by using the security peer (for example, the second base station) address and a local address. The IPsec tunnel is direct IPsec.

The first IPsec tunnel is automatically established. The automatic establishment process is flexible and efficient, while manual configuration is cumbersome and inconvenient. Specifically, the automatic establishment process of the first IPsec tunnel in this embodiment of this application mainly includes a negotiation process of an Internet Key Exchange Protocol security association IKE SA (IKE SA) and an Internet Protocol security association (IPsec SA). The IKE SA is responsible for establishing and maintaining the IPsec SA, and plays a control role. The IPsec SA is responsible for encrypt a specific data stream. The IKE SA can securely distribute a key, authenticate an identity, and establish an IPsec SA on an insecure network, can provide an algorithm negotiation service and a key negotiation service for two communications parties that need encryption and authentication, and can be used by an eNodeB to dynamically establish an IPsec SA. The IKE SA is established through three exchanges: policy negotiation, DH key exchange (Diffie-Hellman key exchange), and peer end identity authentication.

In an example, an IKE SA authentication method includes pre-shared key authentication and digital certificate authentication. Details are as follows:

(1) In the pre-shared key authentication, two communications parties use a same key to authenticate identities of each other. An eNodeB base station side implements legal network access by using a preset pre-shared key.

(2) Through digital certificate authentication of a Certificate Authority (Certificate Authority, CA), a public key infrastructure (Public Key Infrastructure, PKI) system needs to be deployed in a network.

An IPsec SA procedure can protect an X2 interface, an S1-MME interface, an S1-U interface, an OM network management interface, and the like of the eNodeB. A protocol suite includes IKE, Encapsulating Security Payload (Encapsulating Security Payload, ESP), Authentication Header (AH), and the like. A procedure of an IPsec technology is as follows:

In a first phase, two communications parties establish a channel on which security authentication succeeds, namely, an IKE SA.

In a second phase, a specific IPsec SA is established through negotiation by using the established IKE SA.

In a third phase, during data communication, an IPsec transmit end encrypts data, and a receive end decrypts the data.

In the prior art, when the first IPsec tunnel is unavailable, a data packet corresponding to the X2 service can only be discarded, and consequently transmission of the X2 service cannot be completed. Even if there is another preset standby direct IPsec tunnel used with the first direct IPsec tunnel for redundancy purposes, it is very likely that no effective redundancy can be achieved even if there is the standby direct IPsec tunnel because a physical link between the base stations is unavailable or fails. As a result, reliability of the X2 service is low. However, in the prior art, there is a security gateway IPsec tunnel between a base station and a security gateway, and the security gateway IPsec tunnel can transmit data of an S1 interface, and can also forward data of an X2 interface. In other words, the X2 service can directly pass through the direct IPsec tunnel, and can also pass through the security gateway IPsec tunnel by using the security gateway, and an only difference lies in that transmission through the direct IPsec tunnel is faster, while transmission through the security gateway IPsec tunnel is slightly slower. Therefore, if the first IPsec tunnel is unavailable, it may be further checked whether there is a security gateway IPsec tunnel, and if there is a security gateway IPsec tunnel, the X2 service data may be transmitted through the security gateway IPsec tunnel. In other words, if the direct IPsec tunnel cannot ensure normal transmission, the security gateway IPsec tunnel with a lower transmission rate is used as a second-best tunnel to transmit the X2 service, to ensure redundancy of the X2 service. In an example, the security gateway IPsec tunnel is manually preconfigured.

Specifically, determining whether the first IPsec tunnel is available is mainly determining whether an X2 service negotiation packet that is initiated by the first base station to the second base station matches a traffic selector (Traffic Selector, TS) of a negotiation packet of the automatically established first IPsec tunnel. Alternatively, optionally, it may be determined whether an ACL rule (ACLRULE) of a negotiation packet that is used in an IPsec policy (IPsec Policy) referenced by the X2 service matches an ACLRULE used by the first IPsec tunnel. If the X2 service negotiation packet that is initiated by the first base station to the second base station matches the traffic selector of the negotiation packet of the automatically established first IPsec tunnel or the ACL rule of the negotiation packet that is used in the IPsec policy referenced by the X2 service matches the ACLRULE used by the first IPsec tunnel, and an IPsec SA of the first IPsec tunnel exists, it indicates that the first IPsec tunnel is available; or if the X2 service negotiation packet that is initiated by the first base station to the second base station does not match the traffic selector of the negotiation packet of the automatically established first IPsec tunnel or the ACL rule of the negotiation packet that is used in the IPsec policy referenced by the X2 service does not match the ACLRULE used by the first IPsec tunnel, or an IPsec SA of the first IPsec tunnel does not exist, it indicates that the first IPsec tunnel is unavailable. Specific content that matches the TS or the ACLRULE includes a protocol type, a source IP address, a destination IP address, a source port number, a destination port number, and the like. Similarly, a principle of determining whether the second IPsec tunnel is available is the same as a principle of determining whether the first IPsec tunnel is available. Details are not described herein.

In this embodiment, to enable a redundancy relationship to be automatically formed between the security gateway IPsec tunnel (the second IPsec tunnel) and the direct IPsec tunnel (the first IPsec tunnel), a mode of a source address and a destination address in a TS of the security gateway needs to be configured. A mode of a source address and a destination address in a TS of the direct IPsec tunnel is IP to IP, to be specific, a fixed source address to a fixed destination address. This is equivalent to a TS local address range (a TS local IP address range) to a destination address range (a TS remote IP address range). Therefore, the source address and the destination address in the TS of the security gateway IPsec tunnel may be configured as IP to IP, IP to ANY (to be specific, a fixed source address to any destination address), or ANY to ANY (to be specific, any source address to any destination address). However, if the mode of the security gateway IPsec tunnel is set to IP to IP, the security gateway IPsec tunnel is strictly limited only to a fixed end-to-end mode. To be specific, only an IPsec tunnel between a fixed base station and a fixed base station can be manually configured each time. In this rule, no redundancy can be automatically achieved for the direct IPsec tunnel if the first base station needs to transmit the X2 service with a plurality of base stations. In addition, excessive manual configuration processes cause many problems such as cumbersome configurations and a high failure rate of the security gateway IPsec tunnel. Therefore, in this embodiment, the security gateway IPsec tunnel is configured to be in an IP to ANY or ANY to ANY mode, to be specific, an IP address of a receive peer end (a destination end) is not specified, or an address of a transmit end is not specified, either. Therefore, a data packet corresponding to a transmitted X2 service can be sent to a security address of any base station. In short, the TS of the security gateway IPsec tunnel is seemingly inconsistent with the TS of the direct IPsec tunnel, but substantially the TS of the security gateway IPsec tunnel includes the TS of the direct IPsec tunnel. Therefore, a redundancy relationship can be formed between the security gateway IPsec tunnel in this embodiment of this application and any IP to IP direct IPsec tunnel. Certainly, it may be understood that, the to ANY address range may be flexibly configured as required by the X2 service of the first base station.

It should be specifically noted that, configuring the security gateway IPsec tunnel to be in the IP to ANY or ANY to ANY mode is mainly configuring a source IP address range and a destination IP address range that are allowable in the security gateway. For example, in the IP to IP mode, both the source IP address and the destination IP address are configured to be fixed. In the IP to ANY mode, the source IP address is fixed, and the destination IP address is configured to be 0.0.0.0. In the ANY to ANY mode, the source IP address is configured to be 0.0.0.0, and the destination IP address is configured to be 0.0.0.0. It may be understood that, the destination IP address range in the security gateway may be flexibly set based on a range within which the first base station needs to transmit the X2 service. A wider configured destination IP address range can allow an X2 service to be transmitted between more base stations through the security gateway IPsec tunnel by using the security gateway.

The second IPsec tunnel in this embodiment is configured to be in a mode that the first base station can transmit an X2 service with any other base station through the second IPsec tunnel, namely, the IP to ANY or ANY to ANY mode. Therefore, after the mode of the second IPsec tunnel is initially manually configured, when the base station needs to transmit a service on the X2 interface, the base station first determines whether the first IPsec tunnel established in step S202 is available. Because transmission efficiency of the direct IPsec tunnel is higher than transmission efficiency of the security gateway IPsec tunnel, the direct IPsec tunnel, namely, the first IPsec tunnel, is preferentially selected to transmit the X2 service. If the first IPsec tunnel is unavailable, it is considered whether the second IPsec tunnel is available. This facilitates redundancy.

Step S204: Transmit the X2 service data through the second IPsec tunnel if the second IPsec tunnel is available.

Specifically, if the first IPsec tunnel is unavailable and the second IPsec tunnel is available, the X2 service of the first base station may be transmitted through the second IPsec tunnel. So far, a process in which the second IPsec tunnel automatically becomes a configuration-free tunnel of the first IPsec tunnel has been completed. Regardless of which base station (to be specific, an address of a destination end) needs to perform X2 service communication through the first IPsec tunnel, transmission can be performed through the second IPsec tunnel that is more inclusive and that has a wider network segment. Therefore, only one overall configuration is needed, without a need to perform configurations one by one, so that it is more convenient and easier for a user to perform configuration.

Figure 3:
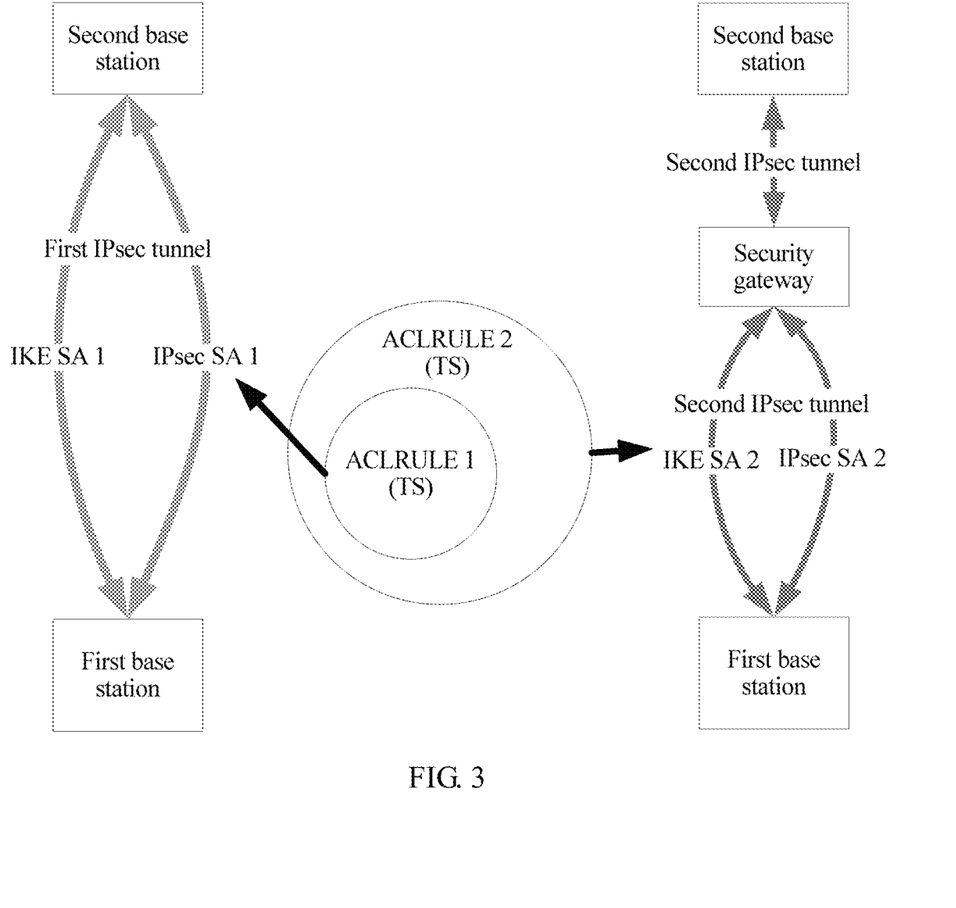
FIG. 3 is a schematic diagram of a specific application scenario of an X2 service transmission method according to an embodiment.

In an application scenario, FIG. 3 is a schematic diagram of a specific application scenario of X2 service transmission according to an embodiment. In FIG. 3, a first base station negotiates with a second base station about an IKE SA 1 of a first phase and an IPsec SA 1 of a second phase, to form a first IPsec tunnel to transmit an X2 service. When the first IPsec tunnel is unavailable, the first base station initiates negotiation about an IKE SA 2 of the first phase and an IPsec SA 2 of the second phase to a security gateway, and continues to transmit the X2 service through a second IPsec tunnel after the negotiation succeeds. Whether negotiation about an IKE SA of the first phase succeeds mainly reflects whether a physical channel between base stations or between a base station and the security gateway is connected and is available for communication. Whether negotiation about an IPsec SA of the second phase succeeds mainly reflects whether an ACLRULE between base stations or between a base station and the security gateway matches. In FIG. 3, an ACLRULE 2 that is used when the base station negotiates with the security gateway about the IPsec SA 2 includes an ACLRULE 1 that is used when the base stations negotiate about the IPsec SA 1, because the IP to ANY or ANY to ANY address transmission range includes the IP to IP address transmission range as described above. Therefore, an automatic redundancy relationship can be formed between the second IPsec tunnel and the first IPsec tunnel, thereby improving reliability of the X2 service. It may be understood that, in FIG. 3, the ACLRULE is merely used as an example. Optionally, the ACLRULE may be replaced with a TS.

It should be noted that, when the X2 service data reaches the security gateway, the security gateway also needs to establish a second IPsec tunnel with the second base station, to finally send the forwarded data to the second base station. For a specific procedure, refer to the communication procedure between the first base station and the security gateway.

According to the X2 service data transmission method provided in this embodiment, if an IPsec tunnel automatically established between base stations is unavailable, it is further determined whether an IPsec tunnel between a base station and a security gateway is available. If the IPsec tunnel between the base station and the security gateway is available, X2 service data is transmitted through the IPsec tunnel between the base station and the security gateway. This resolves a problem that security redundancy cannot be automatically achieved when X2 service data is transmitted between base stations through an IPsec tunnel, thereby improving reliability of X2 service data transmission.

Figure 4:
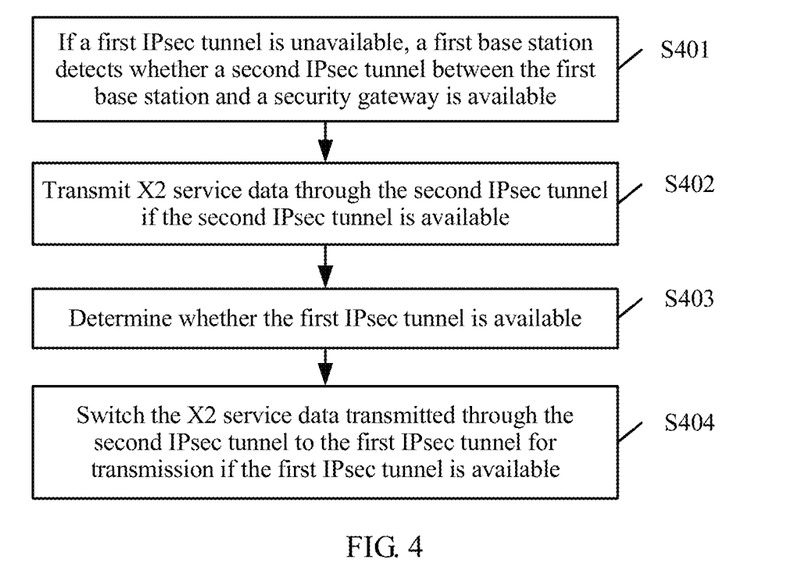
FIG. 4 is a schematic flowchart of another X2 service transmission method according to an embodiment.

FIG. 4 is a schematic flowchart of another X2 service transmission method according to an embodiment of this application. The method may be applied to the network architecture in FIG. 1. A first base station and a second base station may be adjacent base stations, or may base stations that are not adjacent. As shown in FIG. 4, the method includes the following step S401 to step S404.

Step S401: If a first IPsec tunnel is unavailable, the first base station detects whether a second IPsec tunnel between the first base station and a security gateway is available.

Step S402: Transmit the X2 service data through the second IPsec tunnel if the second IPsec tunnel is available.

Specifically, for step S401 and step S402, refer to step S201 and step S202 in the embodiment in FIG. 2.

Step S403: Determine whether the first IPsec tunnel is available.

Specifically, although an X2 service between the first base station and the second base station is currently transmitted through the second IPsec tunnel between the first base station and the security gateway, because transmission efficiency of the direct first IPsec tunnel is apparently higher than that of the second IPsec tunnel, in this embodiment of this application, initiation of an IPsec tunnel negotiation procedure to the second base station is still maintained in a process of transmitting the X2 service data between the first base station and the security gateway. In a specific example, the first base station initiates an IPsec tunnel establishment request packet to the second base station; and monitors whether an IPsec establishment response packet fed back by the second base station is received. If the IPsec tunnel establishment response packet fed back by the second base station is received, the first IPsec tunnel is available. Further, the first base station may initiate the IPsec tunnel establishment request packet periodically or according to a particular time rule. It may be understood that, the IPsec establishment response packet includes an IKE SA negotiation response packet of a first IPsec tunnel establishment phase and an IPsec SA negotiation response packet of a second IPsec tunnel establishment phase.

Step S404: Switch the X2 service data transmitted through the second IPsec tunnel to the first IPsec tunnel for transmission if the first IPsec tunnel is available.

Specifically, if the IPsec establishment response packet fed back by the second base station is received, the first IPsec tunnel is available. If the IPsec establishment response packet fed back by the second base station is not received, the first IPsec tunnel is unavailable. In this application, if the direct IPsec tunnel is unavailable, it is preferentially considered to ensure that the X2 service of the first base station can be normally performed. However, if the direct IPsec is available, transmission efficiency is preferentially considered. To be specific, each time packet matching is performed for X2 service data, it is detected whether the first IPsec tunnel is available. If the first IPsec tunnel is available, it is intended, at any time, to switch the X2 service data transmitted on the security gateway IPsec tunnel back to the direct IPsec for transmission. It may be understood that, a transmitted data packet corresponding to the X2 service may not be resent, and only a data packet that has not been transmitted is switched to the first IPsec tunnel corresponding to the first base station and the second base station for resending. In this way, high transmission efficiency of the X2 service is ensured as much as possible while ensuring that the X2 service can be transmitted.

Optionally, the first base station discards the X2 service data if neither the first IPsec tunnel nor the second IPsec tunnel is available. When neither the direct IPsec tunnel nor the security gateway IPsec tunnel is unavailable, a data packet corresponding to the X2 service needs to be discarded, because if neither of the transmission tunnels is unavailable, a security risk is caused if the data packet is not discarded. This prevents the data packet from being intercepted by another insecure device.

Optionally, the first base station transmits the X2 service data through the first IPsec tunnel if the first IPsec tunnel is available. For example, the first base station transmits the X2 service data through the first IPsec tunnel if both the first IPsec tunnel and the second IPsec tunnel are available. If both the two types of IPsec tunnels are available for transmission, the first IPsec tunnel with a higher transmission speed and higher efficiency is preferentially used.

It should be noted that, when the X2 service data reaches the security gateway, the security gateway also needs to establish a second IPsec tunnel with the second base station, to finally send the forwarded data to the second base station. For a specific procedure, refer to the communication procedure between the first base station and the security gateway.

According to the X2 service data transmission method and the device that are provided in this embodiment, if an IPsec tunnel automatically established between base stations is unavailable, it is further determined whether an IPsec tunnel between a base station and a security gateway is available. If the IPsec tunnel between the base station and the security gateway is available, X2 service data is transmitted through the IPsec tunnel between the base station and the security gateway. This resolves a problem that security redundancy cannot be automatically achieved when X2 service data is transmitted between base stations through an IPsec tunnel, thereby improving reliability of X2 service data transmission.

Figure 5:
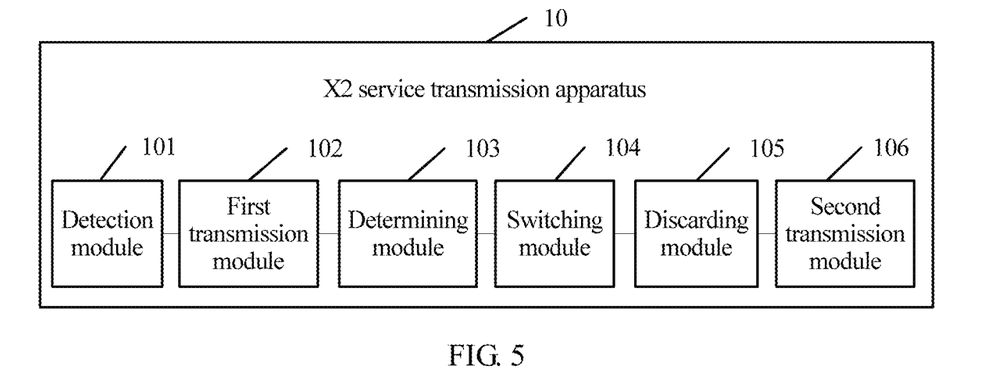
FIG. 5 is a schematic structural diagram of an X2 service transmission apparatus according to an embodiment.

FIG. 5 is a schematic structural diagram of an X2 service transmission apparatus according to an embodiment. As shown in FIG. 5, a first base station 10 includes a detection module 101 and a first transmission module 102.

The detection module 101 is configured to: if a first IPsec tunnel is unavailable, detect whether a second IPsec tunnel between the first base station and a security gateway is available, where the first IPsec tunnel is an IPsec tunnel established between the first base station and a second base station, and the first base station can transmit X2 service data with the second base station through the second IPsec tunnel. The first transmission module 102 is configured to transmit the X2 service data through the second IPsec tunnel if the second IPsec tunnel is available.

Specifically, the first base station can transmit X2 service data with any other base station through the second IPsec tunnel.

Specifically, as shown in FIG. 5, the apparatus 10 further includes:

a determining module 103, configured to determine whether the first IPsec tunnel is available; and a switching module 104, configured to switch the X2 service data transmitted through the second IPsec tunnel to the first IPsec tunnel for transmission if the first IPsec tunnel is available.

Further, the determining module 103 includes: a request unit, configured to initiate an IPsec tunnel establishment request packet to the second base station; and a determining unit, configured to: if an IPsec tunnel establishment response packet fed back by the second base station is received, determine that the first IPsec tunnel is available.

Still further, as shown in FIG. 5, the apparatus 10 further includes a discarding module 105, configured to discard the X2 service data if neither the first IPsec tunnel nor the second IPsec tunnel is available.

Still further, as shown in FIG. 5, the apparatus 10 further includes a second transmission module 106, configured to transmit the X2 service data through the first IPsec tunnel if the first IPsec tunnel is available.

It should be noted that, for functions of the function modules in the network device 10 described in this embodiment, refer to related descriptions of the corresponding first base station in the embodiments shown in FIG. 1 to FIG. 4.

Figure 6:
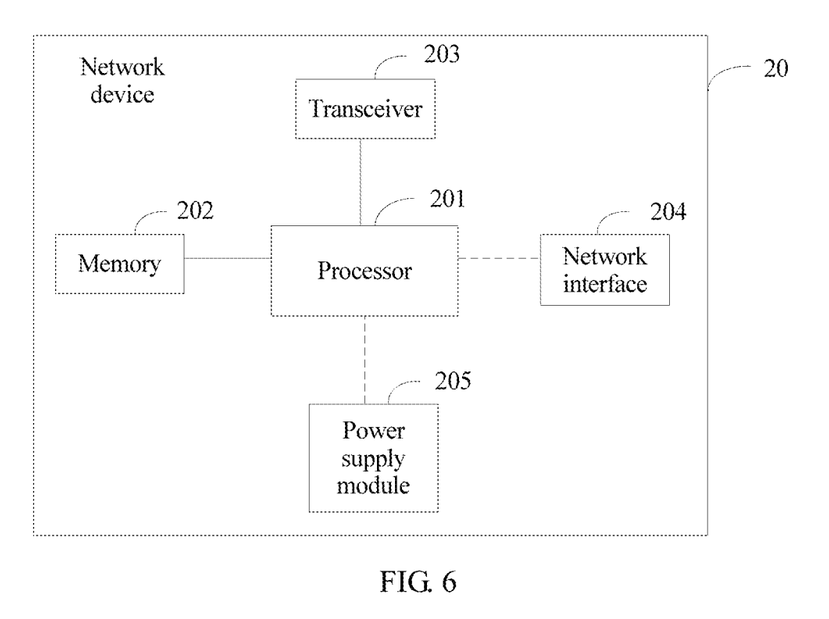
FIG. 6 is a schematic structural diagram of a network device according to an embodiment.

FIG. 6 is a schematic structural diagram of a network device according to an embodiment of this application. The network device may be a first base station. As shown in FIG. 6, a network device 20 includes a processor 201, a memory 202, and a transceiver 203. The processor 201, the memory 202, and the transceiver 203 may be connected by using a bus or in another manner.

Optionally, the network device 20 may further include a network interface 204 and a power supply module 205.

The processor 201 may be a central processing unit (CPU), a general purpose processor, a digital signal processor (DSP), an application-specific integrated circuit (ASIC), a field-programmable gate array (FPGA) or another programmable logic device, a transistor logic device, a hardware component, or any combination thereof. The processor 201 may implement or execute various example logical blocks, modules, and circuits described with reference to content disclosed in this application. Alternatively, the processor may be a combination implementing a computing function, for example, a combination including one or more microprocessors, or a combination of the DSP and a microprocessor.

The memory 202 is configured to store an instruction. During specific implementation, the memory 202 may be a read-only memory (English: Read-Only Memory, ROM for short) or a random access memory (English: Random Access Memory, RAM for short). In this embodiment of this application, the memory 202 is configured to store session connection establishment program code.

The transceiver 203 is configured to receive/send a signal, and is configured to communicate with another network device, for example, receive or send data from or to another base station, a security gateway, or the like.

The network interface 204 is used by the network device 20 to perform data communication with another device. The network interface 204 may be a wired interface or a wireless interface, and perform communication connection between the local network device and another network device, for example a terminal device, a base station, a server, or a security gateway, over a wired or wireless network.

The power supply module 205 is configured to supply power to each module in the network device 20.

The processor 201 is configured to invoke an instruction stored in the memory 202 to perform the following operations:

The processor 201 is configured to: if a first IPsec tunnel is unavailable, detect whether a second IPsec tunnel between the first base station and a security gateway is available, where the first IPsec tunnel is an IPsec tunnel established between the first base station and a second base station, and the first base station can transmit X2 service data with the second base station through the second IPsec tunnel. The transceiver 203 is configured to send and/or receive the X2 service data through the second IPsec tunnel if the second IPsec tunnel is available.

Specifically, the first base station can transmit X2 service data with any other base station through the second IPsec tunnel.

Further, the processor 201 is further configured to: after the X2 service data is transmitted through the second IPsec tunnel, determine whether the first IPsec tunnel is available. The transceiver is further configured to switch the X2 service data transmitted through the second IPsec tunnel to the first IPsec tunnel for transmission if the first IPsec tunnel is available.

Still further, that the processor 201 is configured to determine whether the first IPsec tunnel is available is specifically: initiating an IPsec tunnel establishment request packet to the second base station by using the transceiver 203; and if receiving, by using the transceiver 203, an IPsec tunnel establishment response packet fed back by the second base station, determining that the first IPsec tunnel is available.

Still further, the processor 201 is further configured to discard the X2 service data if neither the first IPsec tunnel nor the second IPsec tunnel is available.

Still further, the processor 201 is further configured to: if the first IPsec tunnel is available, determine to transmit the X2 service data through the first IPsec tunnel. The transceiver 203 is further configured to transmit the X2 service data through the first IPsec tunnel.

It should be noted that, for functions of the function modules in the network device 20 described in this embodiment of this application, refer to related descriptions of the corresponding first base station in the embodiments shown in FIG. 1 to FIG. 4.

An embodiment further provides a computer storage medium. The computer storage medium may store a program. When the program is executed, some or all steps of any X2 service transmission method recorded in the foregoing method embodiments are performed.

Although this application is described herein with reference to the embodiments, in a process of implementing this application that claims protection, another variation of the disclosed embodiments may be implemented by viewing the accompanying drawings, the disclosed content, and the accompanying claims. In the claims, the word "comprising" (comprising) does not exclude another component or step, and "a" or "one" does not exclude a case of "a plurality of". A single processor or another unit may implement several functions enumerated in the claims. Some measures are recorded in appended claims that are different from each other, but this does not mean that these measures cannot be combined to produce a better effect.

Embodiments disclosed herein may be provided as a method, an apparatus (a device), or a computer program product. Therefore, this application may use a form of hardware only embodiments, software only embodiments, or embodiments with a combination of software and hardware. Moreover, embodiments may use a form of a computer program product that is implemented on one or more computer-usable storage media (including but not limited to a magnetic disk memory, a CD-ROM, an optical memory, and the like) that include computer-usable program code. A computer program is stored/distributed in a proper medium and is provided together with other hardware or is used as a part of hardware, or may be distributed in another form, for example, by using the Internet or another wired or wireless telecommunications system.

This detailed descriptions contains reference to the flowcharts and/or block diagrams of the method, the apparatus (device), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may alternatively be stored in a computer readable memory that can instruct the computer or the another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although this application is described with reference to specific features and the embodiments thereof, apparently, various modifications and combinations may be made to this application without departing from the spirit and scope of this application. Correspondingly, the specification and accompanying drawings are merely example descriptions of this application defined by the appended claims, and are considered to cover any or all of modifications, variations, combinations, or equivalents within the scope of this application.

What is claimed is:

1. A network device, comprising:
    a processor and a transceiver, wherein the network device is a first base station;
    wherein the processor is configured to detect whether a second Internet Protocol Security (IPsec) tunnel between the first base station and a security gateway is available if a first IPsec tunnel is unavailable, wherein the first IPsec tunnel is an IPsec tunnel established between the first base station and a second base station, and the first base station can transmit X2 service data with the second base station through the second IPsec tunnel and the transceiver is configured to send and/or receive the X2 service data through the second IPsec tunnel if the second IPsec tunnel is available; and
    wherein the processor is further configured to determine whether the first IPsec tunnel is available after the X2 service data is transmitted through the second IPsec tunnel and the transceiver is further configured to switch the X2 service data transmitted through the second IPsec tunnel to the first IPsec tunnel for transmission if the first IPsec tunnel is available.

2. The network device according to claim 1, wherein the first base station is capable of transmitting X2 service data with any other base station through the second IPsec tunnel.

3. The network device according to claim 1, wherein the processor is further configured to initiate an IPsec tunnel establishment request packet to the second base station by using the transceiver and determine that the first IPsec tunnel is available if receiving, by using the transceiver, an IPsec tunnel establishment response packet fed back by the second base station.

4. The network device according to claim 1, wherein the processor is further configured to discard the X2 service data if the first IPsec tunnel and the second IPsec tunnel are not available.

5. The network device according to claim 1, wherein the transceiver is further configured to transmit the X2 service data through the first IPsec tunnel if the first IPsec tunnel is available.

6. A non-transitory computer-readable medium comprising instructions which, when executed by a processor, cause the processor to perform transmission operations, the transmission operations comprising:
    detecting, by a first base station, whether a second Internet Protocol Security (IPsec) tunnel between the first base station and a security gateway is available if a first IPsec tunnel is unavailable, wherein the first IPsec tunnel is an IPsec tunnel established between the first base station and a second base station, and the first base station is capable of transmitting X2 service data with the second base station through the second IPsec tunnel;
    transmitting the X2 service data through the second IPsec tunnel if the second IPsec tunnel is available;
    determining whether the first IPsec tunnel is available after the X2 service data is transmitted through the second IPsec tunnel; and
    switching the X2 service data transmitted through the second IPsec tunnel to the first IPsec tunnel for transmission if the first IPsec tunnel is available.

7. The non-transitory computer-readable medium according to claim 6, wherein the first base station is capable of transmitting X2 service data with any other base station through the second IPsec tunnel.

8. The non-transitory computer-readable medium according to claim 6, wherein determining whether the first IPsec tunnel is available comprises:
    initiating an IPsec tunnel establishment request packet to the second base station; and
    determining that the first IPsec tunnel is available if receiving an IPsec tunnel establishment response packet fed back by the second base station.

9. The non-transitory computer-readable medium according to claim 6, the transmission operations further comprising:
    discarding, by the first base station, the X2 service data if neither the first IPsec tunnel nor the second IPsec tunnel is available.

10. The non-transitory computer-readable medium according to claim 6, the transmission operations further comprising:
    transmitting, by the first base station, the X2 service data through the first IPsec tunnel if the first IPsec tunnel is available.

* * * * *